Dec. 12, 1933.  E. A. LOWE  1,938,845
AUTOMATIC RELEASE
Filed Oct. 23, 1931   5 Sheets-Sheet 1

INVENTOR
Ernest A. Lowe
BY
ATTORNEYS

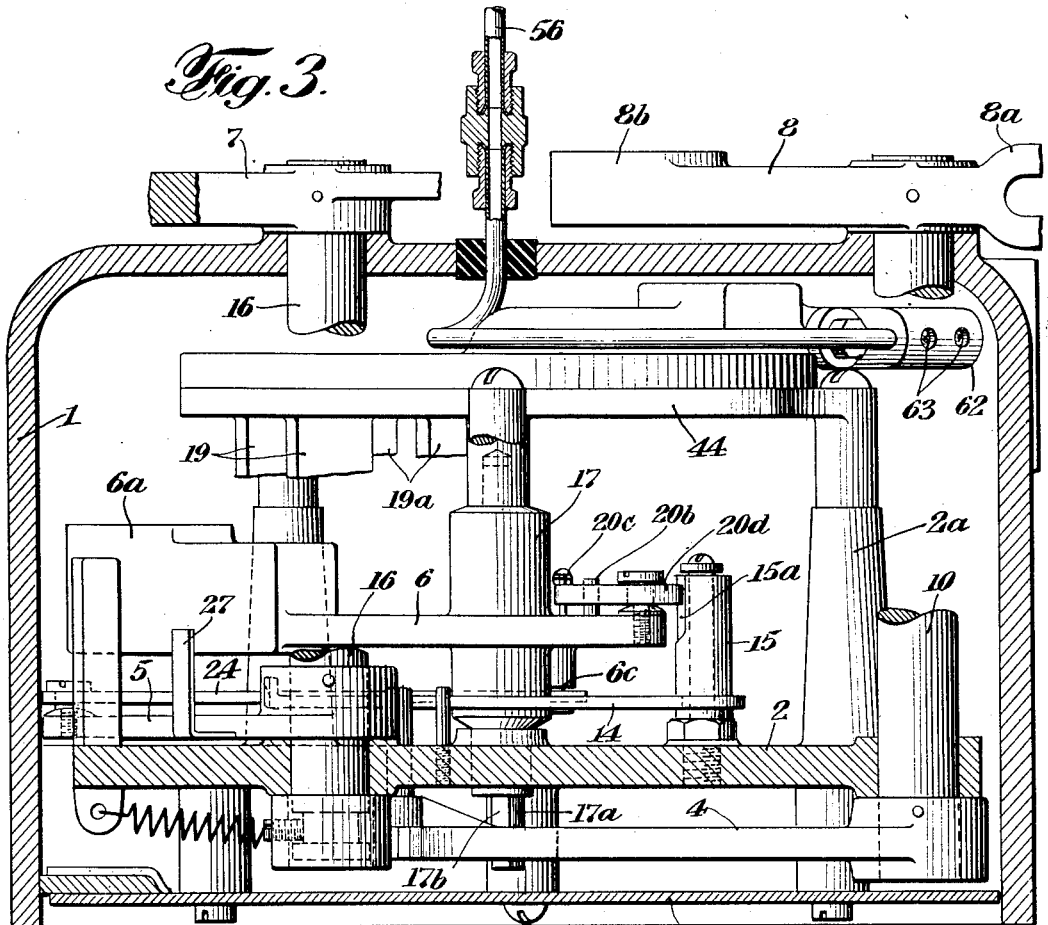
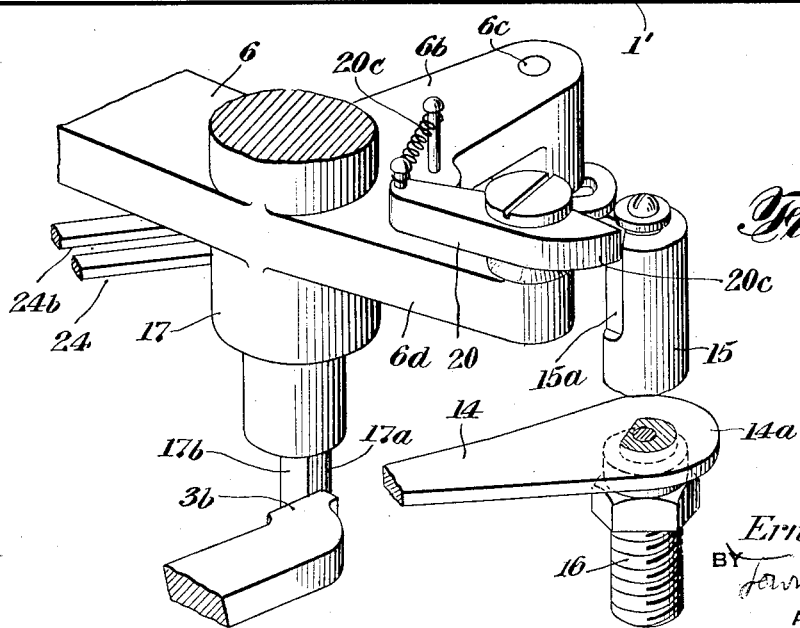

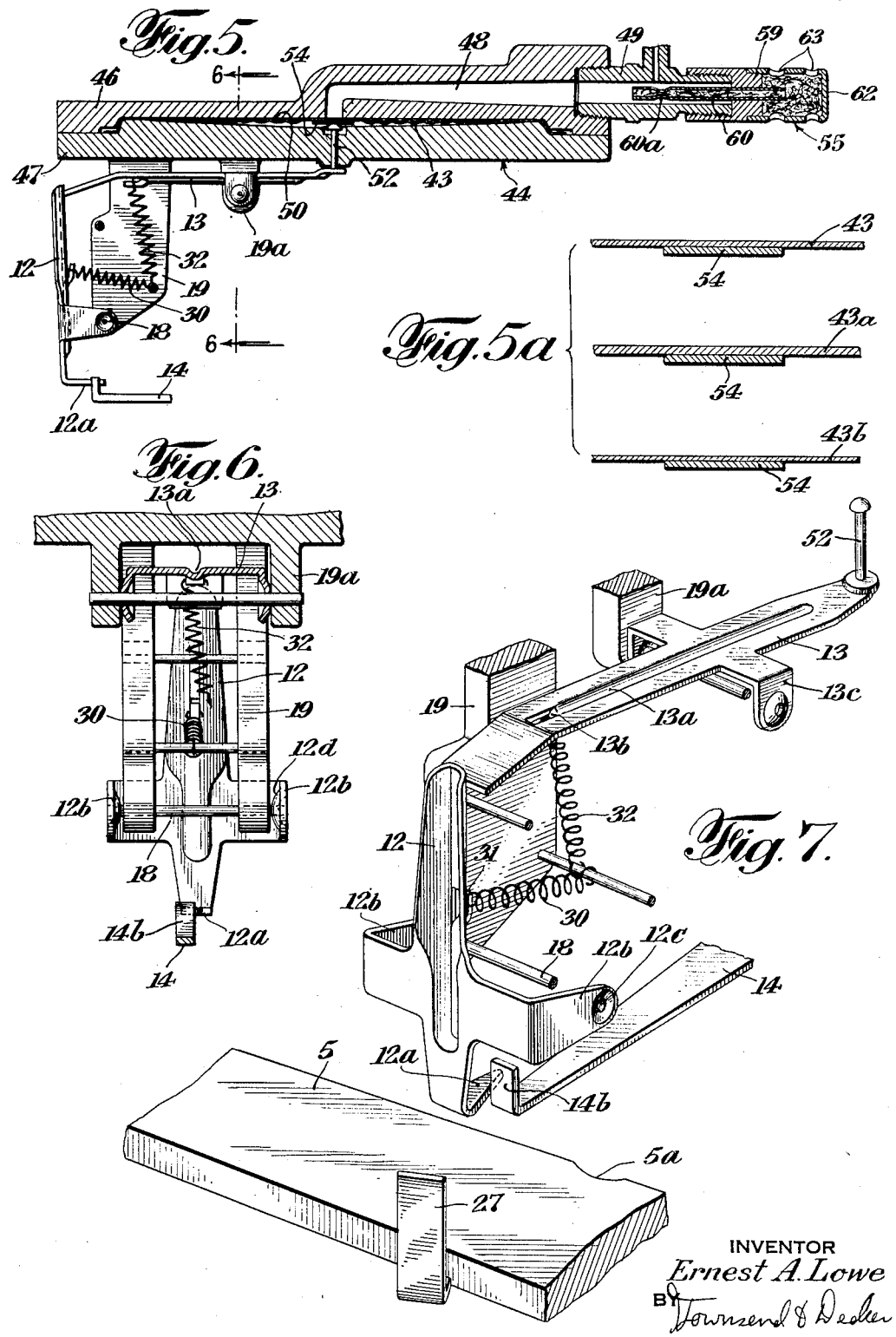

Dec. 12, 1933.    E. A. LOWE    1,938,845
AUTOMATIC RELEASE
Filed Oct. 23, 1931    5 Sheets-Sheet 4

INVENTOR
Ernest A. Lowe
BY
ATTORNEYS

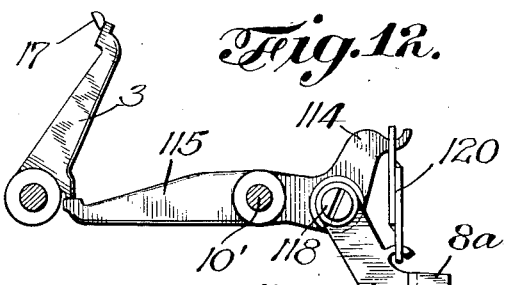
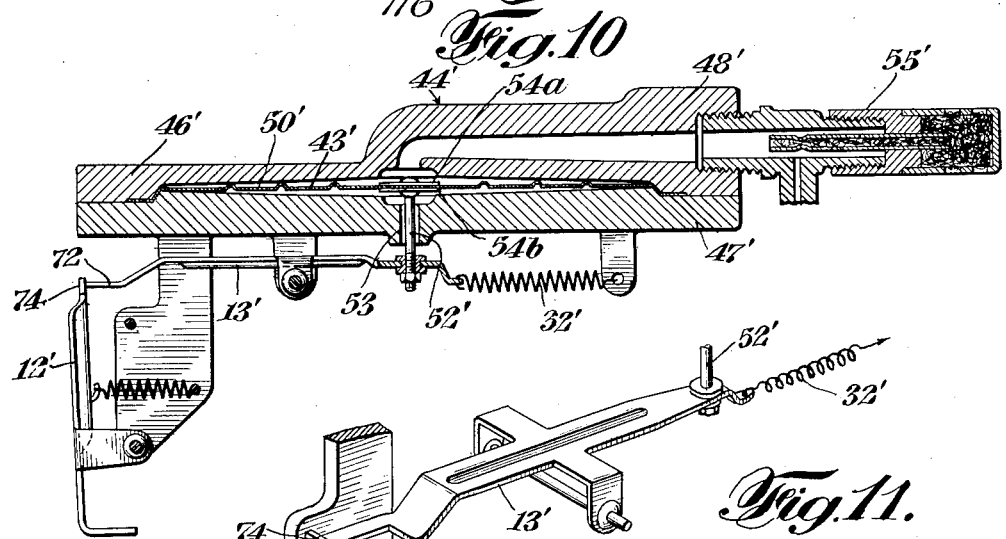
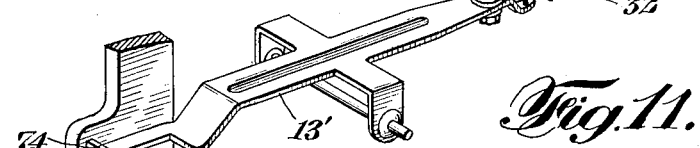
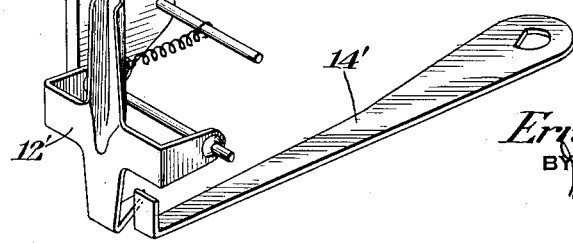

Patented Dec. 12, 1933

1,938,845

UNITED STATES PATENT OFFICE 1,938,845

AUTOMATIC RELEASE

Ernest A. Lowe, Cleveland Heights, Ohio, assignor to Automatic Sprinkler Company of America, Cleveland, Ohio, a corporation of Delaware Application October 23, 1931. Serial No. 570,538

8 Claims. (Cl. 74—93)

This invention relates to improvements in automatic release devices and is primarily intended for use with fire controlling or extinguishing equipment whereby such equipment may be effectively controlled by either automatic or manual control devices.

It is a primary object of the invention to provide a mechanism of this character which can be conveniently manufactured, assembled and installed and which will be substantially uniform in its operation.

More specifically it is an object of the invention to provide a sensitive control apparatus so constructed that it may be completely manufactured, assembled and tested at the factory and which may be installed without adjustment or change and which in use will be at least as sensitive as it was when tested.

It is a further object to provide resetting mechanism for such devices which will require that all of the elements of the release be in their intended or normal positions before the mechanism can be moved to and retained in its set or operative position.

It is a further object of the invention to provide a release mechanism which will operate on either an increase or decrease of pressure supplied through the pneumatic tubing or otherwise.

Various other purposes and objects will be evident from the following description when considered in connection with the drawings in which:

Fig. 3 is a transverse sectional view through the release viewed from beneath.

Fig. 4 is an enlarged perspective view of a portion of the mechanism which maintains the release weight in elevated position.

Fig. 5 is a sectional view taken substantially on the line 5—5 of Fig. 2.

Fig. 5a contains a series of enlarged fragmentary views illustrating the different thicknesses of diaphragms employed in connection with my invention.

Fig. 6 is a sectional view on the line 6—6 of Fig. 5.

Fig. 7 is a perspective view, parts being broken away, of the train of levers actuated directly by the pressure responsive devices.

Figure 8:
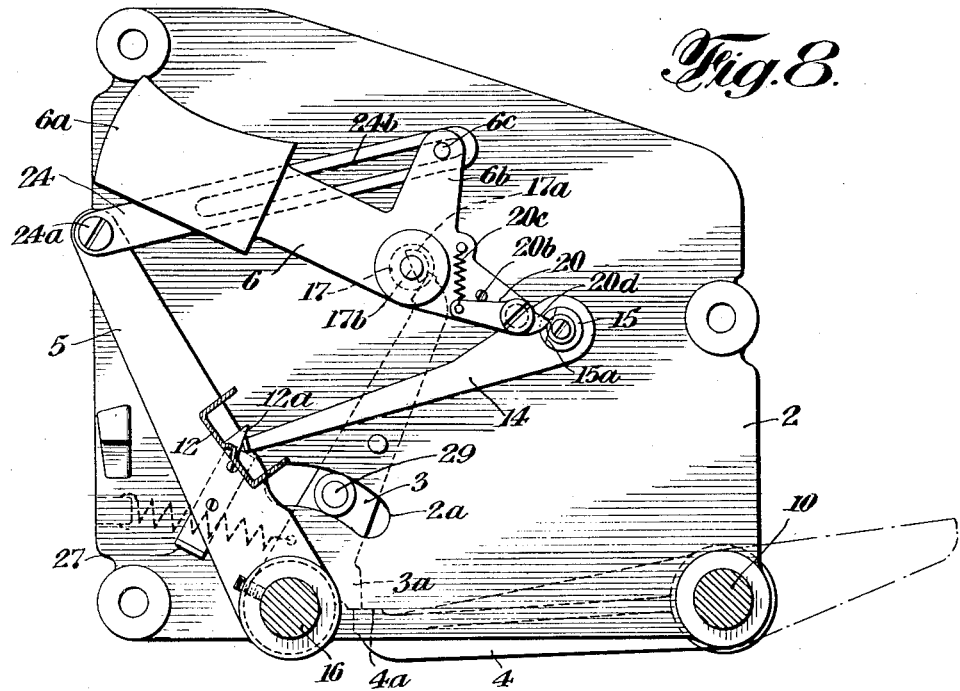
Figure 9:
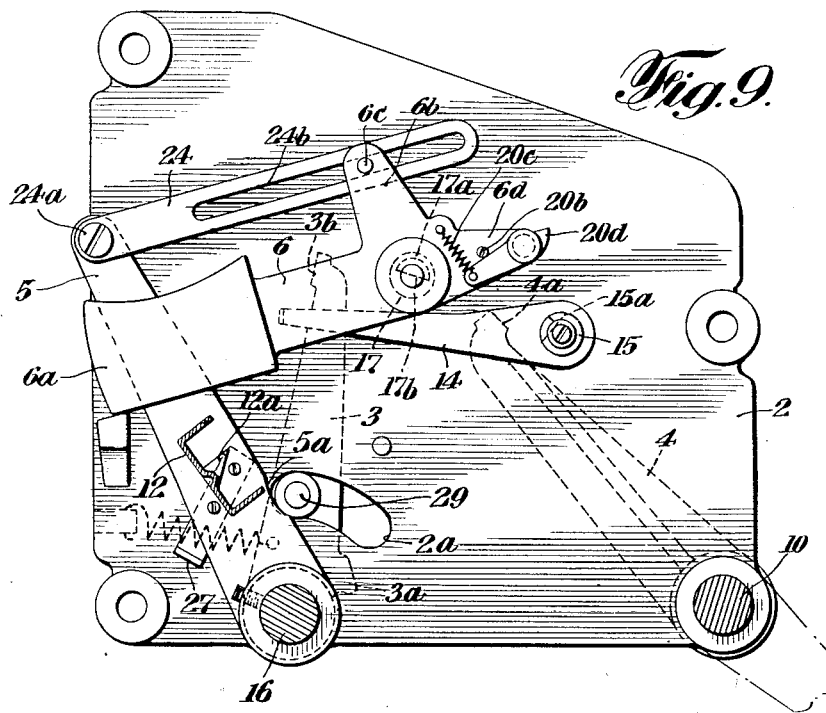

Figs. 8 and 9 are sectional views illustrating the relation of the resetting lever to the control devices and showing respectively the normal position and released position of the parts.

Fig. 10 is a transverse sectional view through the diaphragm housing illustrating the relation of the diaphragm to the escapement levers.

Fig. 11 is a perspective view of the escapement levers shown in Fig. 12.

Fig. 12 is a fragmentary view of a further modification of the weight sustaining levers employed herein.

In accordance with the present invention provision is made for sustaining the relatively heavy weighted device, which is employed herein to be released to perform its intended work, and to control and support such weighted device by means of relatively delicate and sensitive pneumatically controlled members, the parts being so constructed and associated that on a predetermined increase of pressure resulting from a fire condition, or from a manual or other development of pressure, the pneumatically actuated devices will operate the sensitive control levers so that the weight element is released and is permitted to fall and perform its function in controlling fire doors, ringing alarms, releasing fluid control valves, tipping containers of fire controlling fluids or performing other useful work in the position in which it is installed.

Referring first to Figs. 1 to 9 of the drawings there is provided a casing 1 formed with a base 1' for supporting the release upon a wall or other support, the casing housing or supporting the main operating elements of the release. These elements include a main release lever 8 rigidly secured to a shaft 10 which is pivotally mounted on the casing 1 and on the base plate 2. The plate 2 is employed as a supporting plate for receiving the various elements constituting the release. The main release lever 8 is formed with a weight supporting yoke 8a at one end and with an over-weighted portion 8b at the opposite end. The yoke 8a is positioned without the casing 1 and normally supports the operating weight 9 which may be suspended on the release lever by means of the links 9a. One of these links is formed with a semi-spherical supporting head 9b which rests upon the upper surface of the yoke in position to escape from the open end of the yoke when the lever 8 is released and permitted to move to the dotted line position shown in Fig. 1, the head 9b tending to roll upon and be freed from the yoke as the latter falls in operation.

Figure 2:
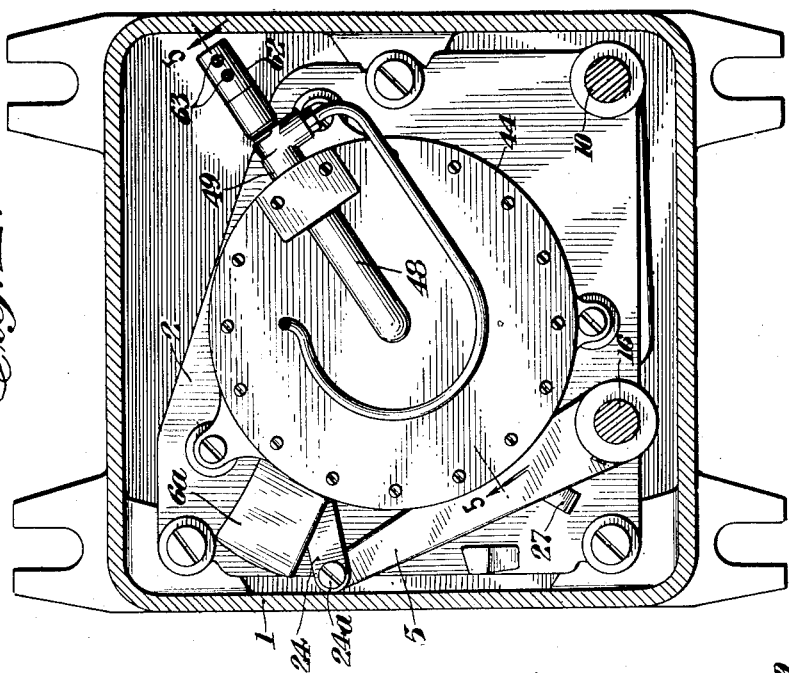
Fig. 2 is a sectional view similar to Fig. 1 but with the outer wall of the release housing removed.
Figure 1:
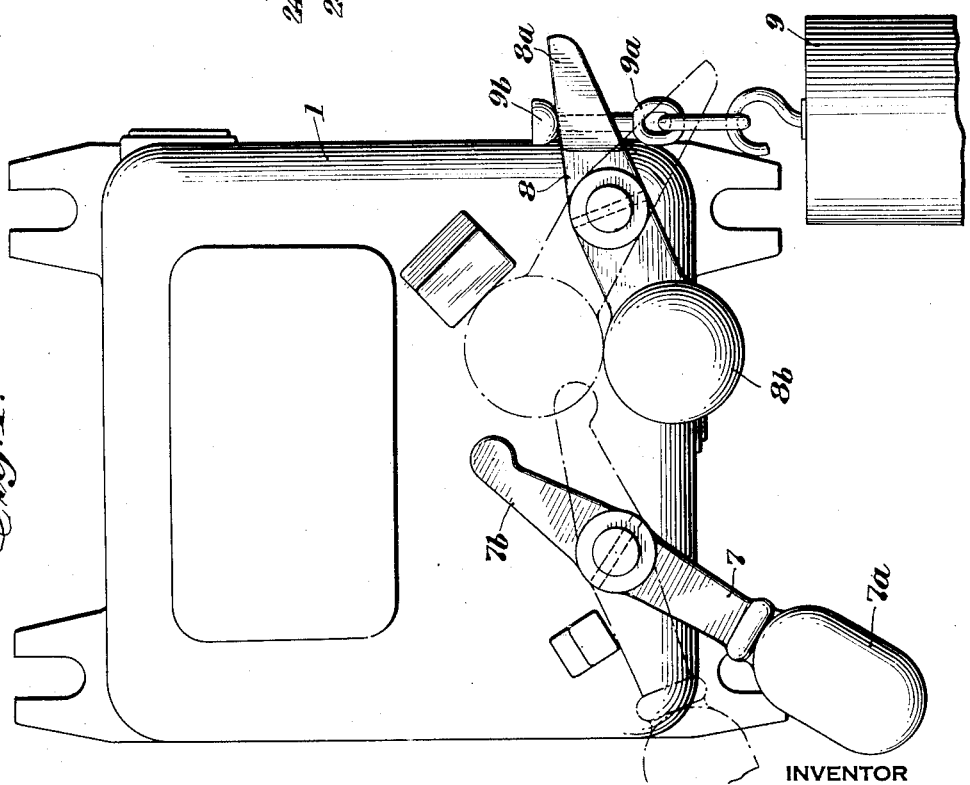
Fig. 1 is an elevational view of the release constructed in accordance with my invention.

The main releasing lever 8 is normally secured in the position shown in Fig. 1 by means of the release operating lever 4 which is rigidly attached to the shaft 10, the free end 4a of the lever 4 engaging beneath a shoulder 3a formed on the locking lever 3. The lever 3 is pivotally mounted on the resetting shaft 16 which in turn is pivotally supported at one end in the plate 2 and at the opposite end in the outer wall of the casing 1. The free end 3b of the lever 3 normally engages against the rearward cylindrical surface 17a constituting a keeper formed on the milled end of the hub or supporting shaft 17 of the operating lever 6. The projection end 17a of the shaft 17 is formed with a cutaway section 17b to permit the end 3b to pass the same when the stud 17 is rotated to the proper position. The lever 3 is provided with a resetting pin 29 secured to the same and projecting through a slot 2a formed in the supporting plate 2, the slot accommodating the limited movement of the lever 3 when moved to released position under the influence of the load or weight 9 or when moved by the resetting levers referred to below.

The shaft 17 is formed with suitable bearings for pivotally supporting the same on the plate 2 and diaphragm casing 44. The lever 6, formed integrally with or securely attached to the shaft 17, is formed with a weighted end 6a which tends to rotate the lever in a counter-clockwise direction as viewed in Fig. 8 and with an angular arm 6b provided with a pin 6c cooperating with the resetting devices of the release referred to below. The locking end 6d of the lever carries a pivotally mounted locking pawl 20 which in co-operation with a suitable ratchet sustains the lever 6 in the position shown in Fig. 8. The pawl 20 is movable in a clockwise direction (as viewed in Fig. 4) to a limited extent only wherein it engages a stop pin 20b, being normally held in engagement with the pin by means of a spring 20c.

The pawl 20 is movable in a counter-clockwise direction to permit the locking end 20d formed on the pawl to move past the retaining portion of the ratchet device.

The ratchet includes a spindle 15 supported for rotation upon a stud 16 secured to the plate 2, the spindle being formed with a cutaway section 15a constituting a ratchet tooth engageable by the locking end 20d of the pawl when the parts are in their operative positions. The escapement lever 14 which controls the ratchet device is formed with an attachment portion 14a provided with an out-of-round opening to be received over the correspondingly shaped inner reduced end of the spindle 15 to cause the lever 14 and spindle 15 to rotate together. The outer movable end of the escapement lever 14 is formed with an angular extension 14b positioned to be engaged by the cam shaped finger 12a formed at one end of the escapement fulcrum lever 12.

The lever 12 is formed with a pair of spaced yoke arms 12b having openings 12c for loosely receiving the pivot pin 18. The material of the arms 12b adjacent the openings 12c is struck out to form the inwardly extending projections or beads 12d, which serve to space the body of the arms 12b from the material of the supporting lugs 19 upon which the lever 12 is mounted. The main body of the lever 12 is formed as a stamping and is preferably U-shaped in cross-section in order to render it more rigid. The tension spring 30, attached to the lever by means of a struck out finger 31, serves to hold the levers 12 and 13 against movement when the apparatus is being shipped and when the apparatus is being reset, the spring also cooperating to some extent with lever 14 in the movement of lever 12 when released.

The lever 12 is normally retained in its locking position by means of the escapement operating lever 13. This lever is formed similarly to the lever 12 with the spaced yoke arms 13 which serve to offset the fulcrum of the lever 13 sufficiently that the tip of the lever when moved in the releasing direction recedes from the lever 12 thereby permitting the latter to move in a releasing direction also for a purpose to appear more fully below. The arms 13c are formed with openings and exterior beads for receiving the pivot pin, the lever having a reinforcing bead 13a and a spring attachment finger 13b struck from the material of the lever. The spring 32 tends to retain the lever 13 in its locking position in engagement with the free end of the lever 12 as shown in Fig. 7 and assists in maintaining the parts stationary during transit.

The levers 12 and 13 are mounted directly on the diaphragm casing 44, by means of the two pairs of lugs 19 and 19a in order that the relation of the escapement levers 12 and 13 to one another and to the diaphragm for operating the levers may be uniform.

The lever 13 is constructed to be moved for operating the release on a predetermined increase of air pressure produced through any desirable automatic or manual devices. The present apparatus accordingly includes a relatively sensitive flexible diaphragm 43 mounted in the diaphragm casing 44 supported upon the projecting lugs 2a formed on the plate 2. The diaphragm 43 is held in place in the casing by having the outer circumferential edge of the same engaged between the upper and lower cases 46 and 47 which when secured together constitute the diaphragm casing. The upper case 46 is constructed for receiving the connection from the supplemental tubing through which pressure is conveyed to the release, and having a duct 48 leading from the T connection 49 to the diaphragm chamber 50. The lower case 47 is provided with an opening for receiving the operating pin 52 which extends between the diaphragm and the escapement lever 13. An abutment plate 54 is positioned in the diaphragm chamber, being preferably secured to the diaphragm 43 near the center of the same, the plate engaging the operating end of the plunger 52. The plate 54 serves to strengthen and make more rigid the central portion of the diaphragm whereby a larger proportion of the diaphragm is effective for moving the plunger 52, the plate 54 also serving to close the opening around the plunger 52 and the receiving pocket into which the head of the plunger moves under the influence of the pneumatic pressure so that an excess pressure against the upper operative face of the diaphragm 43 will not injure the diaphragm. Pressure is conveyed to the diaphragm chamber and passage 48 through a system of tubing 56 which extends into the release casing 1 and is attached to the diaphragm casing by means of the T 49.

In the release disclosed herein it has been found that the sensitiveness of the mechanism can be conveniently and accurately varied by providing diaphragms of varying degrees of rigidity. This is preferably accomplished by employing diaphragms of different degrees of hardness, or of graduated thicknesses. It has been found that three degrees of hardness or of thicknesses of diaphragms, in cooperation with the other adjustments which the apparatus contains, will provide for all of the adjustment required under normal conditions in this portion of the device. It will be understood that increased hardness or increased thickness or both in the diaphragm renders the apparatus less sensitive in its operation.

In Fig. 5a there are illustrated diaphragms having the several degrees of hardness and thickness employed in accordance with my invention. The diaphragm 43 is of intermediate hardness and thickness, this form being shown in Fig. 5. The diaphragm 43a is of greater hardness and thickness and 43b of less hardness and thickness, thus supply the three gradations required. For general application the release may be sent out with the three diaphragms any one of which is to used or, for an installation under known conditions, the proper diaphragm may be placed in the casing before it leaves the factory.

In order to neutralize any pressure condition present in the diaphragm casing or in the conducting tubing the interior of the diaphragm casing is provided with a restricted opening through which the pressure within the tubing is gradually equalized with the surrounding atmosphere. The device for equalizing the interior and exterior pressure comprises an impedance in the form of a vent 55 having a vent cap 59 attached to the T 49 and receiving the vent tube 60 open at its opposite ends into the interior of the casing and to the outside air respectively. The interior of the tube 60 is filled with packing material such as fibrous wadding so that only a slow passage of air is permitted through the tube. The passage of air through the tube is further restricted by means of the restriction 60a formed on the tube by compressing the same against the fibrous packing contained therein. The outer end of the tube is protected and the passage of air is still further restricted by means of the vent shield 62 received over a shouldered portion of the vent cap 59 and provided with a plurality of openings 63, the interior of the vent shield being filled with packing material which surrounds the outlet end of the tube. The vent shield 62 prevents injury to the tube 60 and also prevents dirt or other obstruction from entering the vent tube 60 and further restricts the air flow through the same.

The apparatus is reset by means of the resetting lever 7 and the associated parts. The lever 7 is rigidly mounted on the transverse shaft 16 for rotation about the axis thereof and is formed with a weighted operating end 7a and with an opposed projection 7b, the weight on the lever serving to return the lever 7 to its normal position of rest. The lever 7 is mounted for movement in the same plane as the main release lever 8, both levers being on the outer face of the casing 1. The projecting arm 7b is thus in position to engage the weight 8b to prevent operation of the resetting lever 7 and the mechanism controlled thereby unless the main release lever is in its normal or set position shown in full lines in Fig. 1.

A resetting operating lever 5 is mounted on the shaft 16 to be rotated thereby on movement of the lever 7. The lever 5 is provided with a recess 5a for engagement with the pin 29 for moving the lever 3 and with an angular bracket 27 engageable with the lower end of the lever 12 for resetting the latter when the lever 5 is moved to the right as viewed in Fig. 8. A link 24 is pivotally attached at 24a to the lever 5 and is formed with a slot 24b which receives the pin 6c formed on the projecting member 6b of the lever 6 for resetting this lever on movement of the resetting lever.

In the operation of the apparatus, on the occurrence of an increase in pressure in the tubing 56 the diaphragm 43 is flexed thus moving the escapement lever 13 to a position to free the lever 12, the latter moving under the influence of the lever 14, which engages against the cam finger 12a, to permit the escapement lever 14 to move to the position shown in Fig. 9. The hub 15 rotates with the lever 14 carrying with it the ratchet 15a so that the weighted end 6a of the lever 6 drops to the position shown in Fig. 9. This movement of the lever 6 permits the end 3b of the lever 3 to pass the milled end 17b of the shaft 17. Movement of the lever 3 releases the lever 4 carried by shaft 10 with the result that the main release lever 8 may move to the position shown in dotted lines in Figs. 1 and 9, the weight 9 thus being released to perform its intended function.

The force of the relatively heavy weight 9 passes through the series of reduction links and then bears upon the surface 17a which rotates with the hub of the lever 6. Any increase in the weight 9 thus tends to lessen the effectiveness of the weight 6a in its tendency to rotate in a counter-clockwise direction (Fig. 8). The weight 6a tends to rotate lever 14 and create a mechanical stress on the connecting train of levers 14, 12 and 13, thereby interposing opposition to movement of diaphragm 43. This opposition to movement of diaphragm 43 is greatest when weight 6a is at full value, such condition being found when no load is on lever 8 due to minimum friction at point of contact 17a on lever 6. As load is applied on the yoke 8a of lever 8 friction increases at 17a point of contact. Such friction tends to decrease the value of weight 6 and likewise its tendency to oppose movement of diaphragm 43. Hence, diaphragm 43 becomes more sensitive as weight is increased at 8a. A release mechanism tested with a minimum load at 9 is therefore certain to be operated by the same or a smaller pressure on the diaphragm in actual use.

The relation of the lever arms 7b and 8b is such that it is not possible to move the resetting lever 7 to its resetting position unless the main release lever 8 has been moved to its normal position of rest with the yoke 8b in weight sustaining position. The mounting of the escapement levers, directly controlled by the diaphragm, on the diaphragm casing produces a uniformity of mounting of these elements and a uniform operation of the same not present in such devices as heretofore constructed.

The restricted vent for equalizing the pressure within and without the release is mounted within the release casing and is attached directly to the diaphragm casing so as to avoid any tendency for the pressure impulses to escape before they have reached the diaphragm and conveyed thereto such releasing power as they possess. The construction of the vent itself is such that it operates more satisfactorily than those heretofore constructed. It is more fully protected from injury through any outside force and it is not likely to become out of order through having any material as water or oil or dirt pass inwardly to the vent tube.

In Figs. 10 and 11 there is illustrated an adaptation of the above release mechanism to a fire extinguishing or control system wherein the release is actuated on either an increase or decrease of pressure in the supplemental tubing as will be more fully understood from the following description.

In this form of the invention the diaphragm 43' is mounted within a diaphragm casing 44' which comprises the upper and lower cases 46' and 47'. The diaphragm chamber 50' formed between the two cases 46' and 47' has two concave inner walls to permit the diaphragm to move from either side of its central neutral position as shown. It is preferred to employ two supporting plates 54a and 54b to reinforce the diaphragm at its center near the opening leading to the passage 48' for conveying pressure to the diaphragm and near the opening 53 in which the diaphragm plunger 52' is loosely mounted. The vent 55' connected at the upper side of the diaphragm 43' is employed to gradually equalize the pressure in the supplemental tubing and on the upper face of the diaphragm with the exterior pressure.

The plunger 52' is attached to the diaphragm 43' and to the escapement operating lever 13' as shown so as to transmit movement of the diaphragm in either direction into corresponding movement of the escapement lever. The lever 13' is normally retained in its central neutral position as shown by means of the tension spring 32', the lever 13' being formed with the angular projections 72 engageable against corresponding projecting fingers 74 formed on the escapement lever 12'. With this construction movement of the lever 13' in either direction releases the escapement levers 12' and 14' with the consequent operation of the release.

The levers 12' and 13' are so related that any movement of the lever 13' toward unlatched position in either direction produces a slight corresponding movement of the lever 12' so that on an increase in the load supported by the yoke 8a there occurs an increase in the sensitiveness of the apparatus as in the first form of the invention.

The operating mechanism controlled through the escapement lever 14' is the same in this form of the invention as in that disclosed in Figs. 1 to 9 and is accordingly not reproduced.

The operation of the above described mechanism is substantially the same as in the first form of the invention except that a movement of diaphragm 43' in either direction produces a corresponding movement of the escapement lever 13' and the consequent operation of the escapement lever 13' producing the operation of the release. The pneumatic tubing extending to the passage 48' leading from the fire zone conveys the pneumatic pressure from a fire zone to the upper surface of the diaphragm for moving the same downwardly. On any decrease in pressure in the tubing leading to the passage 48' as, for example where a refrigerating line bursts adjacent one of the heat bulbs connected with the tubing 56 leading to the passage 48' or where an explosion occurs adjacent the diaphragm 43', the diaphragm moves upwardly thus releasing the escapement levers by tilting the projection 72 on lever 13' downwardly with respect to the projection 74 on the lever 12'. The release is thus operated with the same effect whether a relative increase or decrease occurs in the passage 48' with respect to the pressure beneath the diaphragm 43' (Fig. 10).

In Fig. 12 there is disclosed a further slight modification of the invention. In this figure the main release lever 114 pivoted at 10', bears beneath a shoulder 3 as in the first form of the invention. The lever 114 is provided with an arm 116, pivotally connected at 118 to the release lever 114, the levers 114 and 116 being normally retained in the relative positions shown by means of a fusible link 120. The end 122 of the lever 116 is positioned to engage beneath the weight 9 and sustain the weight as in the first form of the invention.

The construction disclosed in Fig. 12 adds an additional safety factor to the entire release mechanism in that if the heat should come into contact with the release mechanism without the release having been previously operated the heat of the fire will fuse the link 122 and permit the release weight to drop.

The present invention constitutes an improvement upon the construction disclosed in my former Patent No. 1,208,177, patented Dec. 12, 1916 and is made for the purpose of simplifying the construction and assemblage of the release and to render it substantially uniform in its operation.

No claim is made herein to the particular type of vent shown and described.

Having now described my invention, I claim:

1. A release mechanism comprising a main release member constructed to releasably support a work element, means for retaining said main release member in its work sustaining position with the work element in position of substantially maximum potential energy and for releasing the same, said means including a flexible pressure responsive element and devices controlled thereby for releasing said main release member on abnormal movement of said element and means for resetting said devices after the same have been operated, said resetting means being dependent in the operation thereof upon the movement of said release member to its normal work sustaining position.

2. A release mechanism comprising a main release member constructed to retain a weighted device when in normal position in position of substantially maximum potential energy of said device or to release the same when said member is moved from its normal position, means for controlling said main release member, said means including a flexible pressure responsive element and devices controlled thereby for releasing said main release member on abnormal movement of said diaphragm and means for resetting said devices after the same have been operated, said resetting means being dependent in the operation thereof upon first returning of said release member to its normal position.

3. A release comprising a main release member constructed to releasably retain a work element in position of substantially maximum potential energy, means responsive to an increase of pressure for releasing said member, means exclusively for resetting said release comprising a shiftable resetting member and means associated with said main release member and with said resetting member and governed by the position of the former for limiting the operation of the latter.

4. In a release mechanism, a diaphragm housing, a diaphragm therein, a weighted releasing lever, means for normally retaining said releasing lever in weight sustaining position, said means including a relatively sensitive escapement lever and a second lever, both said levers being pivotally supported on said diaphragm housing and constructed to latch the second lever by engagement of the other lever therewith and be moved to unlatched position on a predetermined movement of said diaphragm.

5. In a release mechanism, a diaphragm housing, a diaphragm therein, a weighted releasing lever, means for normally retaining said releasing lever in weight sustaining position, said means including a plurality of interengaging relatively sensitive escapement levers pivotally supported on said diaphragm housing and constructed to engage and be latched against releasing said weight when in one position and to be moved to unlatched position on a predetermined movement of said diaphragm.

6. In an automatic release for sustaining or releasing a load, a system of load supporting levers, a set of escapement levers constructed to control said weight supporting levers, a pressure responsive member associated with said escapement levers for operating the same, said weight supporting levers and escapement levers being so constructed and related as to render said pressure responsive device more sensitive in its operation of said escapement levers on increasing the load on said supporting levers.

7. In an automatic release for sustaining or releasing a load, a system of supporting levers terminating in a latch frictionally engaging a movable keeper, a set of escapement levers constructed to move said keeper to unlatched position, movement of said escapement levers in an unlatching direction producing corresponding movement of said keeper during the intermediate movements between completely latched and unlatched positions of said levers and keeper.

8. In a release mechanism, a main release member supporting a weight which tends to fall and perform work when said member is released, a latch member operatively connected with said release member for holding the same in weight sustaining position, a movable member frictionally engaged by said latch member and normally retaining said latch member and release member in weight sustaining position, pneumatically controlled latching devices for effecting the movement of said latch member to unlatched position, said latching devices being constructed to produce unlatching movement of said latch member during unlatching movement of said latching devices.

ERNEST A. LOWE.